United States Patent [19]

Lange et al.

[11] 4,298,490

[45] Nov. 3, 1981

[54] PROCESS FOR THE PRODUCTION OF WASHING POWDERS OF STABILIZED OR ENHANCED APPEARANCE WHICH CONTAIN FLUORESCENT WHITENING AGENTS

[75] Inventors: Burkhart Lange, Basel; Suresh C. Agarwal, Bottmingen; Werner Fringeli, Laufen; Franz Günter, Riehen, all of Switzerland

[73] Assignee: Ciba-Geigy Corporation, Ardsley, N.Y.

[21] Appl. No.: 102,056

[22] Filed: Dec. 10, 1979

[30] Foreign Application Priority Data

Dec. 22, 1978 [CH] Switzerland .................... 13105/78
Sep. 12, 1979 [CH] Switzerland .................... 8251/79

[51] Int. Cl.[3] .................... C09K 11/02; C09K 11/06; C11D 3/42; C11D 11/00

[52] U.S. Cl. .................... 252/91; 252/117; 252/132; 252/174; 252/174.13; 252/174.23; 252/301.35; 252/523; 252/526; 252/541; 252/545

[58] Field of Search .................... 252/117, 121, 132, 174, 252/174.13, 174.23, 301.35, 524, 539, 540, 543, 558, 559, 541, 91, 174.21

[56] References Cited

U.S. PATENT DOCUMENTS

| | | | |
|---|---|---|---|
| 3,000,830 | 9/1961 | Fong | 252/117 |
| 3,254,028 | 5/1966 | Wixon | 252/524 |
| 3,575,866 | 4/1971 | Gaf | 252/543 |
| 3,846,324 | 11/1974 | Lohmann | 252/95 |

FOREIGN PATENT DOCUMENTS

| | | | |
|---|---|---|---|
| 1181543 | 2/1970 | United Kingdom . | |
| 1204123 | 9/1970 | United Kingdom | 252/106 |
| 1502105 | 2/1978 | United Kingdom . | |
| 1526004 | 9/1978 | United Kingdom . | |

OTHER PUBLICATIONS

Research Disclosure; Nov. 1976, No. 151, pp. 18–20.

*Primary Examiner*—Dennis L. Albrecht
*Attorney, Agent, or Firm*—John P. Spitals; Edward McC. Roberts

[57] ABSTRACT

The invention relates to the production of washing powders of stabilized or enhanced appearance which contain a fluorescent whitening agent of the formula

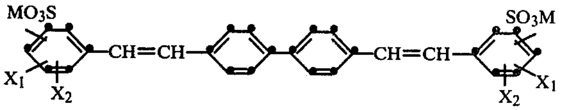

wherein $X_1$ is hydrogen, chlorine, bromine, alkyl or alkoxy, $X_2$ is hydrogen or alkyl and M is hydrogen, an alkali metal or ammonium ion. The stabilizing or enhancement of the appearance is effected by first dissolving or dispersing the fluorescent whitening agent in a mixture of water and a polyvinyl alcohol or polyvinyl pyrrolidone which is soluble or is able to swell in water, adding this solution or dispersion to the washing powder slurry and drying the slurry. The solution or dispersion can also be subsequently sprayed onto the dried residual washing powder. The appearance can be further enhanced by employing a polyethylene glycol, a surfactant containing ethyleneoxy and/or propyleneoxy groups, and/or a cellulose ether, in addition to the polymer in the solution or dispersion. The solution or dispersion comprising fluorescent whitening agent and polymer can also alternatively be dried, preferably by spray drying, to produce a preparation which, after it has been suspended in water, can also be added to the washing powder slurry. The slurry is then dried, preferably by spray drying.

19 Claims, No Drawings

PROCESS FOR THE PRODUCTION OF WASHING POWDERS OF STABILIZED OR ENHANCED APPEARANCE WHICH CONTAIN FLUORESCENT WHITENING AGENTS

The present invention relates to a process for the production of washing powders of stabilised or enhanced appearance which contain one or more fluorescent whitening agents of the bis-styrylbiphenyl type.

It has long been known to add fluorescent whiteners to detergents. Reference is made in this connection e.g. to Environmental Quality and Safety, Supplement Volume 4, Fluorescent Whitening Agents, pages 59–62, ed. by Coulston+Korte, G. Thieme Verlag, Stuttgart 1975; German patent specification No. 731 558; and numerous other patent specifications relating to fluorescent whitening agents. It is also known to add specific fluorescent whitening agents to detergents in powder form in order to enhance the appearance of the detergents (see e.g. J. of Color+Appearance 1 (1972), 5, page 46).

Like other fluorescent whitening agents of the stilbenesulfonic acid type, the compounds of the formula (1) herein (known from British patent specification No. 1,247,934) are most suitable for whitening and brightening textiles in a wash bath. If, however, they are incorporated in solid washing powders in the customary manner, they have an exceedingly undesirable drawback: not only do they barely enhance the appearance of the washing powder, but frequently even cause a deterioration in its appearance. Unattractive greenish-yellow washing powders of reduced commercial value are obtained in this manner.

The production of washing powders usually comprises preparing a slurry from the individual components (surface-active substance, salts, builder, water etc.), and then drying this slurry, preferably by spray drying at elevated temperature. If desired, various further ingredients which are resistant to drying at elevated temperature (e.g. in the range from 200° to 300° C.) are subsequently added to the dry washing powder. Thus non-ionic surfactants can be sprayed onto the washing powder and/or certain additives, e.g. perborate, perfumes, enzymes, dyes and other thermolabile substances, blended with the otherwise finished washing powder. Fluorescent whitening agents are usually added to the slurry before it is spray dried. The unattractive greenish-yellow washing powders referred to above are usually obtained by means of this procedure. Even the later addition of fluorescent whitening agents is not able to effect any stabilising or enhancement of the appearance. The same problem arises when incorporating fluorescent whitening agents of the bis-triazinylaminostilbene-disulfonic acid type. Means of improvements have already been proposed, such as the addition of various substances, e.g. alcohols, sugars, certain surface-active substances etc. Attention is drawn in this regard to Japanese patent publications Sho 51-5308, 51-6687, 46-35273 and 49-967. However, all these means are not sufficient to solve the problem on which this invention is based, and they effect no adequate stabilising or enhancement of the appearance of the washing powder.

The present invention is based on the surprising observation that it is possible to obtain an excellent white appearance by a specific process for producing washing powders which contain fluorescent whitening agents, and that particularly good white effects can be obtained on the textiles washed with these washing powders.

The process of the present invention for the production of washing powders of stabilised or enhanced appearance which contain one or more fluorescent whitening agents of the formula (1)

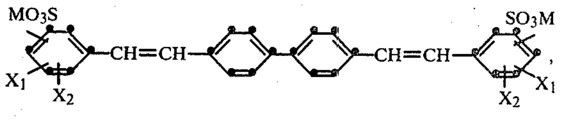

wherein $X_1$ is hydrogen, chlorine, bromine, or alkyl or alkoxy, each containing 1 to 4 carbon atoms, $X_2$ is hydrogen or alkyl of 1 to 4 carbon atoms, and M is hydrogen, an alkali metal, ammonium or amine salt ion, consists in first dissolving or dispersing the fluorescent whitening agent or agents in a mixture of water and a polyvinyl alcohol or polyvinyl pyrrolidone which is soluble or swellable in water, and adding the solution or dispersion so obtained, which may additionally contain a polyethylene glycol, a surfactant containing ethyleneoxy and/or propyleneoxy groups, or a cellulose ether, to the washing powder slurry and subsequently drying this slurry, or, optionally after the addition of further washing powder components, spraying said solution or dispersion onto a dried unfinished washing powder, or drying the solution or dispersion containing the fluorescent whitening agent or agents to a powder, suspending said powder in water, adding the resultant suspension to the washing powder slurry, and subsequently drying this slurry.

Preferred alkali metal ions M in formula (1) are sodium and potassium ions. Suitable amine salt ions M are principally those of the formula $-HN^{+}R_1R_2$, wherein $R_1$ is hydrogen or unsubstituted or substituted alkyl, and $R_2$ is unsubstituted or substituted alkyl. Preferred substituted alkyl radicals, which preferably contain 1 to 4 carbon atoms, are hydroxyalkyl, cyanoalkyl, haloalkyl and benzyl. M is preferably hydrogen, sodium, potassium, or ammonium.

It is an essential feature of the process of the invention that the fluorescent whitening agent is dissolved or dispersed in the mixture of water and a polymer (polyvinyl alcohol or polyvinyl pyrrolidone, or mixtures of these polymers), as otherwise the desired effect is not achieved. Particularly advantageous results are obtained with polyvinyl alcohol.

It is preferred to employ polyvinyl alcohols having a degree of hydrolysis of 80 to 100 mol.% and a viscosity between 3 and 66 cP, especially those having a degree of hydrolysis of 90 to 100 mol.% and a viscosity of 3 to 10 cP. In this specification, all viscosity values indicated for polyvinyl alcohol are measured in a 4% aqueous solution at 20° C.

Polyvinyl pyrrolidones suitable for the process of the present invention preferably have a molecular weight of 10,000 to 360,000, especially from 15,000 to 50,000. It will be appreciated that the term "polyvinyl pyrrolidone" encompasses not only the polymerisation products of unsubstituted vinyl pyrrolidone, but also those of substituted, e.g. alkylsubstituted, vinyl pyrrolidones.

The specified polymers form solutions with water if they do not have a high molecular weight. However, it suffices also if the polymers swell or are dispersed in water.

The aqueous mixtures in which the fluorescent whitening agent is dissolved or dispersed preferably contain at least 0.01% by weight, most preferably at least 0.05% by weight, of the respective polymer. The maximum content of polymer is determined by the flowability of the mixture obtained and depends on the molecular weight of the respective polymer. Where a flowable mixture is obtained, high concentrations of polymer do not impair the operability of the process. In practice, suitable concentrations of polymer in the mixture are preferably between 0.01 and 20% by weight, especially between 0.05 and 10% by weight.

To enhance the appearance of the finished washing powder further, it is possible to add to the mixture of water and polyvinyl alcohol or polyvinyl pyrrolidone in which the fluorescent whitening agent is dissolved or dispersed, a polyethylene glycol, a surface-active substance containing ethyleneoxy and/or propyleneoxy groups, or a cellulose ether. An enhanced effect is obtained in particular with the following substances:

(a) polyethylene glycols, preferably those having a molecular weight of 100 to 10,000;

(b) cellulose ethers, e.g. hydroxypropyl cellulose, methyl cellulose, carboxymethyl cellulose, methylhydroxypropyl cellulose;

(c) copolymers of polyethylene oxide and polypropylene oxide of the formula $$HO(C_2H_4O)_x—(C_3H_6O)_y—(C_2H_4O)_zH,$$

wherein the content of ethylene oxide (x+z) is 10 to 85% by weight, and that of propylene oxide (y) is 15 to 90% by weight. The molecular weight of such polymers is between 2000 and 20,000;

(d) ethoxylated aliphatic alcohols of the formula $$H(C_2H_4O)_a—OR,$$

wherein a is an integer between 10 and 200, especially between 30 and 200, and R is alkyl of 12 to 20 carbon atoms, alkenyl of 12 to 18 carbon atoms, or phenylalkyl;

(e) ethoxylated alkylphenols of the formula

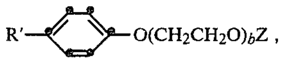

wherein R' is alkyl of 6 to 18 carbon atoms, Z is hydrogen, $—SO_3M'$ or $PO_3M'$, in which M' is hydrogen, an alkali metal or ammonium ion, and b is an integer between 6 and 30.

Preferably, the amounts in which the above mentioned optional components are added are 1 to 50 times, especially 1 to 20 times, e.g. 1 to 10 times, the amount of polyvinyl alcohol or polyvinyl pyrrolidone, or mixtures thereof, present in the aqueous mixture.

The fluorescent whitening agent can be dissolved or dispersed e.g. at room temperature in the medium consisting of water and the polymer specified above. Frequently, however, it is advantageous to heat the mixture, e.g. to a temperature in the range from 30° to 100° C., preferably from 40° to 80° C., especially from 60° to 80° C., whereby a more rapid or a better solution or dispersion of the fluorescent whitener in the mixture is often achieved.

If a dispersion is obtained when mixing the fluorescent whitening agent with the polymer solution or dispersion—and this is usually so—then it can be advantageous to subject this dispersion to a wet grinding before the addition to the detergent in order to effect a better dispersion of the fluorescent whitening agent by reducing the particle size. The wet grinding can be carried out e.g. by adding glass beads to the dispersion and grinding it in a ball mill. The temperature during the grinding procedure can be in the range between room temperature and the boiling point of the dispersion, e.g. between 20° and 80° C. Depending on the desired fineness of the dispersion, the grinding can take up to several hours, e.g. from 1 to 10 hours.

The amount of fluorescent whitening agent to be dissolved or dispersed depends on the desired amount in the finished washing powder. It can be e.g. from 0.001 to 10% by weight, preferably from 0.01 to 5% by weight, especially from 0.05 to 2% by weight. Very good results are obtained with amounts from 0.1 to 0.5% by weight.

The ratio between the fluorescent whitening agent and the polymer or polymer mixture in the aqueous solution or dispersion, or in the dried fluorescent whitener preparation obtained therefrom, can vary within wide limits and depends on the fluorescent whitening agent employed and the nature of the polymer or polymers. For example, the ratio of fluorescent whitening agent to polymer can be about 9:1 to 1:10. When using polyvinyl alcohol, it is preferably in the region of 80:20 to 40:50, most preferably of 70:30. When using polyvinyl pyrrolidone, the ratio of fluorescent whitening agent to polymer is e.g. between 1:1 and 1:10, preferably about 1:9.

Within the scope of the process of this invention, preferred fluorescent whitening agents of the formula (1) are those of the formula

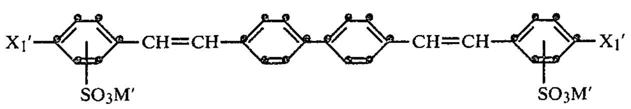

(2)

wherein $X_1'$ is hydrogen or chlorine and M' is hydrogen, sodium, potassium or ammonium, or mixtures of several of these fluorescent whitening agents, especially those of the formulae

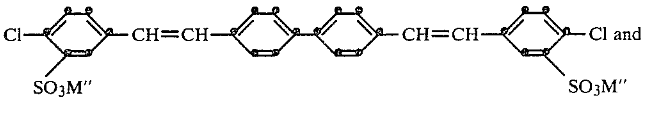

(3)

and

-continued

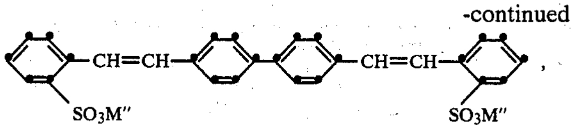

(4)

wherein M'' is hydrogen, sodium or potassium, as well as mixtures of fluorescent whitening agents of the formulae (3) and (4), especially those in which M'' is sodium.

The fluorescent whitening agent is preferably incorporated in the detergent by adding the solution of dispersion (obtained as described above) to the washing powder slurry (mixture of the customary components) and then drying the slurry containing the fluorescent whitening agent in the conventional manner. If the slurry contains substances which are unstable at elevated temperatures (e.g. certain surfactants, such as those which contain ethyleneoxy groups), then it is dried at low temperature, e.g. below 50° C. Normally, however, the slurry is dried at elevated temperature, e.g. up to 300° C., for example by conventional spray drying or fluidised bed drying.

The solution or dispersion can, however, also be sprayed onto the dried washing powder (e.g. by spray drying in a spray tower) in the conventional manner employed for obtaining washing powders containing thermolabile substances, e.g. certain surfactants containing ethyleneoxy groups. This constitutes a very important method in practice. It is, however, also possible to mix the solution or dispersion with suitable detergent components which are normally added to the otherwise finished washing powder at the conclusion of the production process (e.g. with sodium perborate, bleaching agents such as chlorine donors, enzymes, parfumes etc.), and then to apply this mixture to the already existing residual powder.

It is decisive for the success of the process of the invention that the fluorescent whitening agent should be dissolved or finely dispersed in the above described mixture. The best results are obtained when the fluorescent whitening agent is dissolved or very finely dispersed (e.g. by an additional grinding) in the corresponding medium.

A second varient of incorporating the fluorescent whitening agent or agents in the washing powder by the process of the invention consists in drying the aqueous solution or dispersion of fluorescent whitener and polymer to a fine powder, suspending this powder in water, and mixing this suspension with the washing powder slurry and drying this latter in conventional manner, e.g. that described above.

This second variant is especially advantageous if it is not possible to dissolve the fluorescent whitening agent in the aqueous polymer solution or dispersion, and only a dispersion is obtained. In this case, a further enhancement of the appearance of the washing powder can be achieved by first drying the dispersion. As already described, it is often advantageous to subject the dispersion of the fluorescent whitening agent and polymer or polymers to a wet grinding procedure before drying this dispersion.

The solution, in particular dispersion, can be dried by conventional methods. The dispersion can simply be dried in a drying cabinet, e.g. in the temperature range from 40° to 100° C., preferably from 50° to 80° C., and the dry substance obtained is ground to a fine powder. However, it is advantageous to dry the dispersion with hot air in a spray tower to produce a fine powder. The powder containing the fluorescent whitening agent and polymer or polymers is incorporated in the washing powder by suspending it in water and adding this suspension to the washing powder slurry, which is then dried in conventional manner, e.g. also by spray drying.

A further advantage of the above described second variant of the process of the invention is that the powder obtained by drying the dispersion (fluorescent whitener preparation in powder form) can be easily stored over a prolonged period of time without discolouration or other diminution of the quality of the fluorescent whitener. This preparation can therefore also be used as a commercial formulation of the respective fluorescent whitening agent. Regardless of where the preparation is produced, the incorporation in a washing powder can be effected anywhere.

In contradistinction to the variants of the process of the invention, the addition of the respective polymers and fluorescent whitening agents, without dissolving or dispersing them in the aqueous polymer solution or dispersion, to the washing powder separately, does not effect the desired enhancement of the appearance of the washing powder (attention is also drawn in this connection to the Examples). However, if the washing powder is produced in the manner according to the invention, then, surprisingly, there no longer occurs any deterioration in the appearance of the washing powder during storage, although this would be expected because of the presence of large amounts of electrolytes and the attendant "salting out" action on the fluorescent whitening agent.

The process of the invention can be used for incorporating the fluorescent whitening agents in any detergent composition in powder form. Such compositions preferably contain the known mixtures of active detergents, for example soap in the form of chips and powders, synthetics, soluble salts of sulfonic acid hemiesters of higher fatty alcohols, arylsulfonic acids with higher and/or multiple alkyl substituents, sulfocarboxylic acid esters of medium to higher alcohols, fatty acid acylaminoalkyl- or acylaminoaryl-glycerol sulfonates and phosphoric acid esters of fatty alcohols. Suitable builders which can be used are, for example, alkali metal polyphosphates and polymetaphosphates, alkali metal pyrophosphates or aluminosilicates, alkali metal salts of carboxymethylcellulose and other soil redeposition inhibitors, and also alkali metal silicates, alkali metal carbonates, alkali metal sulfates, alkali metal perborates, nitrilotriacetic acid, ethylenediaminetetraacetic acid, and foam stabilisers, such as alkanolamides of higher fatty acids. The detergents can further contain for example: antistatic agents, fat restorative skin protectives such as lanolin, enzymes, antimicrobial agents, perfumes, colourants, and bleaching activators such as tetraacetylethylenediamine or tetraacetylglycoloril. Examples of suitable detergents will be found in the illustrative Examples which follow.

Incorporation of the fluorescent whitening agents of the formula (1) in a washing powder by the process of this invention results at least in a stabilising of the appearance of the washing powder, i.e. the washing powder treated with fluorescent whitening agent is at least as white in appearance as the washing powder without fluorescent whitening agent. The often observed greenish or yellowish discolouration of the detergent caused by the addition of fluorescent whitener can thus be avoided. Usually, however, the process of the invention effects an enhancement of the appearance of the washing powder, i.e. the powder treated with fluorescent whitener has a whiter appearance than one which does not contain whitening agent.

The washing powders obtained by the process of the invention are most suitable for washing textiles to produce a good white effect on the washed substrates.

It is a further object of this invention to provide the aqueous solutions or dispersions which contain one or more fluorescent whitening agents of the formula (1), a polyvinyl alcohol or polyvinyl pyrrolidone which is water-soluble or swells in water, and optionally a polyethylene glycol, a surfactant containing ethyleneoxy and/or propyleneoxy groups, and/or a cellulose ether, and which can be incorporated in washing powders by the process of the invention. The composition and preparation of these solutions or dispersions, as well as the preferred embodiments of these solutions or dispersions, are described above.

It is yet a further object of the invention to provide the preparations obtained from the solutions or dispersions described above and which comprise one or more fluorescent whitening agents of the formula (1), a polyvinyl alcohol or polyvinyl pyrrolidone, and optionally a polyethylene glycol, a surfactant containing ethyleneoxy and/or propyleneoxy groups, and/or a cellulose ether.

These dry preparations comprise one or more fluorescent whitening agents of the formula (1) and a polyvinyl alcohol having a degree of hydrolysis of 80 to 100% and a viscosity of 3 to 66 cP, or a polyvinyl pyrrolidone with a molecular weight of 10,000 to 360,000, the ratio of fluorescent whitening agent to polymer being preferably 9:1 to 1:10, when using polyvinyl alcohol especially from 80:20 to 40:50, preferably 70:30, and when using polyvinyl pyrrolidone, especially 1:1 to 1:10.

Most preferably, in addition to containing the fluorescent whitening agent, such a preparation contains a polyvinyl alcohol having a degree of hydrolysis of 90 to 100% and a viscosity of 3 to 10 cP.

Preferred fluorescent whitening agents in the above preparations are those of the formula (4), especially those of the formula (3), and mixtures thereof.

The following Examples illustrate the process of the invention in more detail, without implying any restriction to what is described therein, as well as the solutions or dispersions employed in this process and the dry preparations obtained therefrom.

EXAMPLE 1

20 mg of the fluorescent whitening agent of the formula (3), wherein M'' is sodium, together with 20 mg of polyvinyl alcohol (degree of hydrolysis 99%; viscosity 28 cP) are dissolved at 60° C. in 20 ml of deionised water. A homogeneous paste is obtained by stirring this solution at room temperature with 20 g of a detergent of the following composition in 20 ml of deionised water:

| | |
|---|---|
| alkylarylsulfonate | 17.5% |
| fatty alcohol sulfate | 3.7% |
| coconut fatty acid monoethanolamide | 2.7% |
| sodium tripolyphosphate | 39.0% |
| sodium silicate | 4.0% |
| magnesium silicate | 2.0% |
| carboxymethyl cellulose | 1.0% |
| sodium ethylenediaminetetraacetate | 0.5% |
| water | 6.7% |
| sodium sulfate to make up | 100.0% |

This paste (slurry) is spread on a porcelain dish, dried for 10 hours at 80° C. under 150 torr in a vacuum drying cabinet. The detergent is then pressed through a sieve with a 0.8 mm mesh, beneath which there is a second sieve with a 0.315 mm mesh. On this sieve there remains a powder of uniform particle size which is used for determining the appearance. The washing powder so obtained has an attractive white appearance.

EXAMPLE 2

The procedure of Example 1 is repeated using 100 mg of the fluorescent whitening agent of the formula (4), wherein M'' is sodium, and 100 mg of polyvinyl alcohol. A washing powder with an attractive white appearance is likewise obtained.

EXAMPLE 3

20 mg of the fluorescent whitening agent of the formula (3), wherein M'' is sodium, are dissolved in a mixture of 20 mg of polyvinyl alcohol (viscosity 5 cP; degree of hydrolysis 97–99%), 100 mg of polyethylene glycol (mol. wt. about 400), and 20 ml of water. A homogeneous paste is obtained by stirring this solution at room temperature with 20 g of a detergent of the composition of Example 1 in 20 ml of deionised water. This paste is dried for 2 hours at 80° C. in vacuo and then pulverised. A washing powder with a pure white appearance is obtained.

EXAMPLE 4

White washing powders are also obtained by repeating the procedure of Example 3 and substituting the substances listed in Table 1 for polyethylene glycol.

TABLE 1

| Additive | Amount (mg) | Appearance of the resultant washing powder |
|---|---|---|
| polyethylene glycol 4000 (mol. wt. = about 4000) | 200 | white |
| "Pluronic L 92" | 200 | white |
| "Pluronic F 68" | 200 | white |
| "Pluronic F 108" | 200 | white |
| polyethylene oxide (mol. wt. = about 4000) | 140 | white |

The substances listed in Table 1 under the name "Pluronic" are polymerisation products of the formula $HO(C_2H_4O)_x$-$(C_3H_6O)_y$-$(C_2H_4O)_zH$.

"Pluronic L 92" has about a 20% content of ethylene oxide and a molecular weight of about 3500; "Pluronic F 68" has about an 80% ethylene oxide content and a molecular weight of about 9000; and "Pluronic F 108" has about an 80% ethylene oxide content and a molecular weight of about 17,000.

EXAMPLE 5

20 mg of the fluorescent whitening agent of the formula (3), wherein M'' is sodium, are dissolved in a mixture of 20 mg of polyvinyl alcohol (degree of hydrolysis 97–99%; viscosity 28 cP) and 140 mg of polyethylene glycol 400 (mol. wt. about 400), and 20 ml of water. The mixture is processed to a slurry and the slurry is dried as in Example 3. A washing powder with a very white appearance is obtained.

By dispensing with the addition of 140 mg of polyethylene glycol 400, the resultant white washing powder has a faintly greenish hue.

EXAMPLE 6

The procedure of Example 5 is repeated, substituting the substances listed in Table 2 for 140 mg of polyethylene glycol 400. Washing powders with a very white appearance are also obtained.

TABLE 2

| Additive | Amount (mg) | Appearance of the resultant washing powder |
|---|---|---|
| hydroxypropyl cellulose (mol. wt. 60000) | 200 | white |
| methylhydroxypropyl cellulose | 200 | white |
| methyl cellulose | 200 | white |
| coconut fatty acid diethanolamide | 200 | white |
| C-decylbetaine | 200 | white |

If the procedure of this Example is repeated without the addition of polyvinyl alcohol, the washing powders obtained are yellow in appearance.

EXAMPLE 7

100 mg of the fluorescent whitening agent of the formula (4), wherein M'' is sodium, are dissolved in a mixture of 1 g of polyvinyl pyrrolidone K 25 (mol. wt. about 24,000) and 20 ml of water. A paste (slurry) is prepared with this solution as described in Example 3 and then dried. The resultant washing powder has a pure white appearance.

EXAMPLE 8

20 mg of the fluorescent whitening agent of the formula (3), wherein M'' is sodium, are dissolved in a mixture of 1 g of polyvinyl pyrrolidone K 25 (mol. wt. about 24,000) and 20 ml of water. The solution is stirred with 20 g of a washing powder of the composition indicated in Example 1 and the paste so obtained is dried for 2 hours in a vacuum cabinet at 80° C. After it has been pulverised, the washing powder is sieved and the granulate having a particle size between 0.3 and 0.8 mm is evaluated visually. The washing powder has a pure white appearance.

EXAMPLE 9

The procedure of Example 8 is repeated, substituting equal amounts of the polyvinyl pyrrolidones listed in Table 3 for polyvinyl pyrrolidone K 25. Washing powders with a very white appearance are also obtained.

TABLE 3

| Polyvinyl pyrrolidone | molecular weight (approx.) | Appearance of the washing powder |
|---|---|---|
| K10 | 10,000 | white |
| K30 | 40,000 | white |
| K60 | 160,000 | white |
| K90 | 360,000 | white |

EXAMPLE 10

20 mg of the fluorescent whitening agent of the formula (3), wherein M'' is sodium, are dissolved in a mixture of 100 mg of polyvinyl pyrrolidone K 25 (mol. wt. about 24,000) and 20 ml of water. The solution is stirred to a paste with 20 g of a washing powder of the following composition:

| | |
|---|---|
| alkanoylbenzenesulfonate | 8% |
| ethoxylated fatty alcohol | 2.9% |
| soap | 3.5% |
| sodium tripolyphosphate | 43.8% |
| sodium silicate | 7.5% |
| carboxymethy cellulose | 1.2% |
| sodium ethylenediaminetetra-acetate | 0.2% |
| sodium sulfate | 21.2% |
| water to make up | 100.0% |

After addition of 60 ml of water, the suspension is dried in a spray tower with hot air (about 200° C.). The washing powder so obtained has a pure white appearance.

EXAMPLE 11

20 mg of the fluorescent whitening agent of the formula (3), wherein M'' is sodium, are dissolved in a mixture of 1 g of an alkylated polyvinyl pyrrolidone copolymer and 20 ml of water. This solution is incorporated in a washing powder as described in Example 1 and the resultant slurry is dried. A washing powder of very white appearance is obtained.

EXAMPLE 12

20 mg of the fluorescent whitening agent of the formula (3), wherein M'' is sodium, are dissolved at 60° C. in a mixture of 20 mg of polyvinyl alcohol (degree of hydrolysis 100%, viscosity 66 cP), 100 mg of the surfactant of the formula

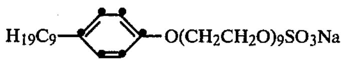

and 20 ml of deionised water. This solution is stirred to a paste at room temperature with 20 g of a detergent of the composition of Example 1. The paste is subsequently dried for 10 hours at 80° C. under 100 torr. The detergent is pulverised and evaluated as in Example 1. The resultant washing powder has an attractive white appearance.

EXAMPLE 13

20 mg of the fluorescent whitening agent of the formula (3), wherein M'' is sodium, are dissolved in a mixture of 20 mg of polyvinyl alcohol (degree of hydrolysis 98%; viscosity 4 cP), 200 mg of a polyethylene oxide cetyl ether of the formula $H(C_2H_4O)_{30}\text{-}O\text{-}C_{16}H_{33}$, and 20 ml of water. This solution is stirred to a paste at room temperature with 20 g of a detergent composition as described in Example 1. This paste is subsequently dried for 2 hours at 80° C. in a vacuum drying cabinet. The residue is pulverised and the washing powder is sieved. The granulate having a particle size between 0.3 and 0.8 mm is evaluated visually. It has an attractive white appearance.

A washing powder with a pure white appearance is likewise obtained by substituting a polyethylene oxide cetyl ether of the formula $H(C_2H_4O)_{80}$-O-$C_{16}H_{33}$ for that of the formula $H(C_2H_4O)_{30}$-O-$C_{16}H_{33}$.

COMPARISON EXAMPLE A 20 mg of the fluorescent whitening agent of the formula (3), wherein M'' is sodium, are stirred at 20° C. in 20 ml of deionised water which contains about 1 g of a detergent of the composition indicated in Example 1. Then a further 19 g of the detergent are added and mixed until a homogeneous paste is obtained. This paste is spread on a porcelain dish and dried for 4 hours at 80° C./400 torr in a vacuum drying cabinet, then loosened with a spatula, and subsequently dried for 3 hours at about 80° C. under 250 torr.

The washing powder is reduced to small particles and its appearance determined as described in Example 1. The washing powder so obtained has unattractive greenish appearance which is poorer than that of the washing powder which does not contain fluorescent whitening agent.

COMPARISON EXAMPLE B

To the detergent slurry of Comparison Example A which contains the fluorescent whitening agent of the formula (3), wherein M'' is sodium, is additionally mixed, before drying, 20 mg of polyvinyl alcohol (viscosity 28 cP, degree of hydrolysis 99%). The slurry is then dried and pulverised as described in Comparison Example A. The washing powder so obtained has about as unattractive an appearance as that of Comparison Example A.

This Example shows that it is not sufficient to add the polymers to be employed in the process of the invention to the detergent, but that the fluorescent whitening agent must be dissolved or dispersed beforehand in the appropriate medium. A subsequent solution in the detergent itself is obviously not possible.

EXAMPLE 14

A suspension of 70 g of the fluorescent whitening agent of the formula (3), wherein M'' is sodium, in 130 ml of water is dispersed in a solution of 30 g of polyvinyl alcohol (degree of hydrolysis 98%; viscosity 4 cP) in 100 ml of water. The dispersion is ground in a ball mill for 8 hours at 80° C. with 350 g of glass beads (diameter 1 mm). The glass beads are removed and the dispersion is then dried by spray drying with hot air. The resultant powder has a brilliant pure white appearance.

The above powder is incorporated in a washing powder by the following procedure: 100 mg of the dry powder obtained in this Example are suspended in water and this suspension is added to 70 g of a detergent of the composition as indicated in Example 1 in 70 ml of water. The resultant paste (slurry) is dried either by the method of Example 1 or in a spray tower with hot air. In both cases the resultant washing powder has a pure white appearance which it also retains after storage in moist air.

EXAMPLE 15

A suspension of 50 g of the fluorescent whitening agent of the formula (3), wherein M'' is sodium, in 130 ml of water is dispersed in a solution of 50 g of polyvinyl alcohol (degree of hydrolysis 98%; viscosity 4 cP) in 100 ml of water. The dispersion is ground for 8 hours at 30° C. in a ball mill with 350 g of glass beads (diameter 1 mm). The glass beads are removed and the dispersion is then dried at 50° C. in a drying cabinet and subsequently pulverised. A pure white powder is obtained.

The above powder is incorporated in a washing powder by the following procedure: 100 mg of the dry powder obtained in this Example are suspended in water and this suspension is added to 50 g of a detergent of the composition as indicated in Example 1 in 50 ml of water. The resultant paste (slurry) is dried either by the method of Example 1 or in a spray tower with hot air. In both cases the resultant washing powder has a pure white appearance which it also retains after storage in moist air.

EXAMPLE 16

A suspension of 41 g of the fluorescent whitening agent of the formula (3), wherein M'' is sodium, and 28 g of the fluorescent whitening agent of the formula (4), wherein M'' is sodium, in 80 ml of water, is dispersed in a solution of 31 g of polyvinyl alcohol (degree of hydrolysis 98%; viscosity 4 cP) in 100 ml of water. The dispersion is dried with hot air in a spray tower. The resultant powder containing fluorescent whitening agent and polyvinyl alcohol has a brilliant white appearance.

The above powder is incorporated in a washing powder by the following procedure: 100 mg of the dry powder obtained in this Example are suspended in water and this suspension is added to 70 g of a detergent of the composition as indicated in Example 1 in 70 ml of water. The resultant paste (slurry) is dried either by the method of Example 1 or in a spray tower with hot air. In both cases the resultant washing powder has a pure white appearance which it also retains after storage in moist air.

EXAMPLE 17

A suspension of 41 g of the fluorescent whitening agent of the formula (3), wherein M'' is sodium, and 28 g of the fluorescent whitening agent of the formula (4), wherein M'' is sodium, in 80 ml of water, is dispersed in a solution of 31 g of polyvinyl alcohol (degree of hydrolysis 98%; viscosity 4 cP) in 100 ml of water. The dispersion is ground in a ball mill for 8 hours at 50° C. with 350 g of glass beads. The glass beads are then removed and the dispersion is dried by spray drying with hot air. The dispersion can also be dried at 50° C. in a drying cabinet with subsequent pulverisation of the dry preparation. In each case the powder containing fluorescent whitening agent and polyvinyl alcohol has a pure white appearance.

The incorporation of the powder in the washing powder is carried out as described in Example 16.

EXAMPLE 18

Example 16 or 17 is repeated using a mixture of 20 g of polyvinyl alcohol and 11 g of sodium tripolyphosphate instead of 31 g of polyvinyl alcohol. A powder of pure white appearance is likewise obtained. The addition of sodium tripolyphosphate facilitates the spray drying of the dispersion.

The incorporation of the preparation in a washing powder is effected as described in the preceding Examples.

EXAMPLE 19

A suspension of 10 g of the fluorescent whitening agent of the formula (3), wherein M" is sodium, in 20 ml of water is dispersed in a solution of 90 g of polyvinyl pyrrolidone K25 (molecular weight about 24,000) in 180 ml of water. The dispersion is dried by spray drying with hot air or in a drying cabinet at 50° C. In the latter case, the dry powder is additionally pulverised. The resultant powder of polyvinyl pyrrolidone and fluorescent whitening agent has a pure white appearance.

The above powder is incorporated in a washing powder by the following procedure: 100 mg of the dry powder obtained in this Example are suspended in water and this suspension is added to 10 g of a detergent of the composition as indicated in Example 1 in 10 ml of water. The resultant paste (slurry) is dried either by the method of Example 1 or in a spray tower with hot air. In each case the resultant washing powder has a pure white appearance which it also retains after storage in moist air.

What is claimed is:

1. A process for the production of a washing powder of stabilized or enhanced appearance which contains one or more fluorescent whitening agents of the formula (1)

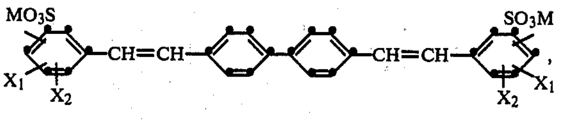

wherein $X_1$ is hydrogen, chlorine, bromine, or alkyl or alkoxy, each containing 1 to 4 carbon atoms, $X_2$ is hydrogen or alkyl of 1 to 4 carbon atoms, and M is hydrogen, an alkali metal, ammonium or amine salt ion, which process comprises first dissolving or dispersing the fluorescent whitening agent or agents in a mixture of water and a polyvinyl alcohol or polyvinyl pyrrolidone polymer which is soluble or swellable in water, wherein the ratio of fluorescent whitening agent or agents to polymer in the aqueous solution or dispersion, or in the dry powder obtained therefrom, is 9:1 to 1:10, and adding the solution or dispersion so obtained, which may additionally contain a polyethylene glycol, a surfactant containing ethyleneoxy and/or propyleneoxy groups, or a cellulose ether, to the washing powder slurry and subsequently drying this slurry, or, optionally after the addition of further washing powder components, spraying said solution or dispersion onto a dried unfinished washing powder.

2. A process according to claim 1, which comprises wet grinding the dispersion before it is incorporated in the washing powder slurry or before it is dried.

3. A process according to claim 2, wherein the wet grinding procedure is carried out in a ball mill in the temperature range between room temperature and the boiling point of the dispersion.

4. A process according to claim 1, which comprises dissolving or dispersing the fluorescent whitening agent or agents in a mixture of water and a polyvinyl alcohol having a degree of hydrolysis of 80 to 100% and a viscosity between 3 and 66 cP, or a polyvinyl pyrrolidone having a molecular weight of 10,000 to 360,000.

5. A process according to claim 1, wherein the mixture of water and the polymer contains at least 0.01% by weight of polymer.

6. A process according to claim 1 wherein the ratio of fluorescent whitening agent to polyvinyl alcohol is 80:20 to 40:50.

7. A process according to claim 1, wherein the ratio of fluorescent whitening agent to polyvinyl pyrrolidone is 1:1 to 1:10.

8. A process according to claim 1, wherein the mixture of water and polyvinyl alcohol or polyvinyl pyrrolidone, in which the fluorescent whitening agent is dissolved or dispersed, additionally contains a polyethylene glycol, a surfactant containing ethyleneoxy and/or propyleneoxy groups, or a cellulose ether, in an amount of 1 to 50 times the amount of polyvinyl alcohol or polyvinyl pyrrolidone, or mixture thereof, present in the aqueous mixture.

9. A process according to claim 1, wherein the dissolving or dispersing of the fluorescent whitening agent in the aqueous polymer mixture is accelerated by heating in the temperature range from 40° to 80° C.

10. A process according to claim 1, which comprises the use of a fluorescent whitening agent of the formula

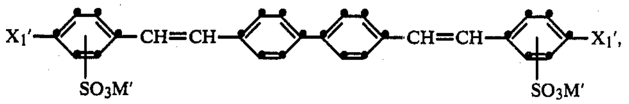

wherein $X_1'$ is hydrogen or chlorine and M' is hydrogen, sodium, potassium or ammonium, or mixtures of several such fluorescent whitening agents.

11. A process according to claim 10, which comprises the use of a fluorescent whitening agent of the formula

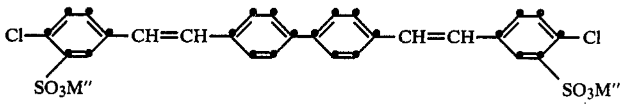

wherein M" is hydrogen, sodium or potassium.

12. A process according to claim 10, which comprises the use of a fluorescent whitening agent of the formula

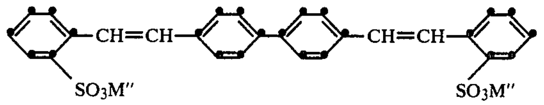

wherein M'' is hydrogen, sodium or potassium.

13. A process according to claim 1, wherein said washing powder slurry is dried by spray dying.

14. A process according to claim 2, wherein the wet grinding procedure is carried out in a ball mill in the temperature range between 20° and 80° C.

15. A process according to claim 6, wherein the ratio is about 70:30.

16. A process according to claim 8, wherein said mixture of water and polyvinyl alcohol or polyvinyl pyrrolidone additionally contains a polyethylene glycol having a molecular weight between 100 and 10,000, a cellulose ether, a copolymer of polyethylene oxide and polypropylene oxide having a molecular weight of 2000 to 20,000 of the formula $$HO(C_2H_4O)_x—(C_3H_6O)_y—(C_2H_4O)_zH,$$

wherein the content of ethylene oxide (x+z) is 10 to 85% by weight and the content of propylene oxide (y) is 15 to 90% by weight, an ethoxylated alcohol of the formula $$H(C_2H_4O)_a—OR,$$

wherein a is an integer between 10 and 200, and R is alkyl of 12 to 20 carbon atoms, alkenyl of 12 to 18 carbon atoms, or phenylalkyl, or an ethoxylated alkylphenyl of the formula

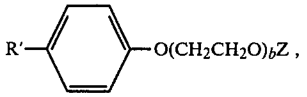

wherein R' is alkyl of 6 to 18 carbon atoms, Z is hydrogen, $—SO_3M'$ or $—PO_3M'$, in which M' is hydrogen, an alkali metal or ammonium ion, and b is an integer between 6 and 30.

17. A process according to claim 16, wherein a is between 30 and 100.

18. A process according to claim 9, wherein said temperature range is from 60° to 80° C.

19. A process according to claim 10, which comprises the use of a mixture of the fluorescent whitening agents

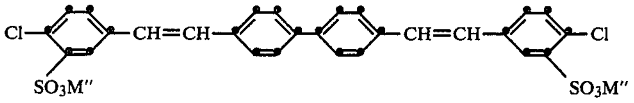

and

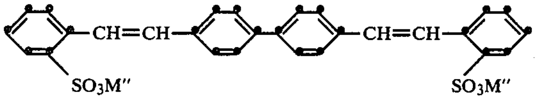

wherein M'' is sodium.

* * * * *